Nov. 5, 1935.   G. A. LYON   2,019,716
DOUBLE SECTION TIRE COVER
Filed Jan. 2, 1932   2 Sheets-Sheet 1
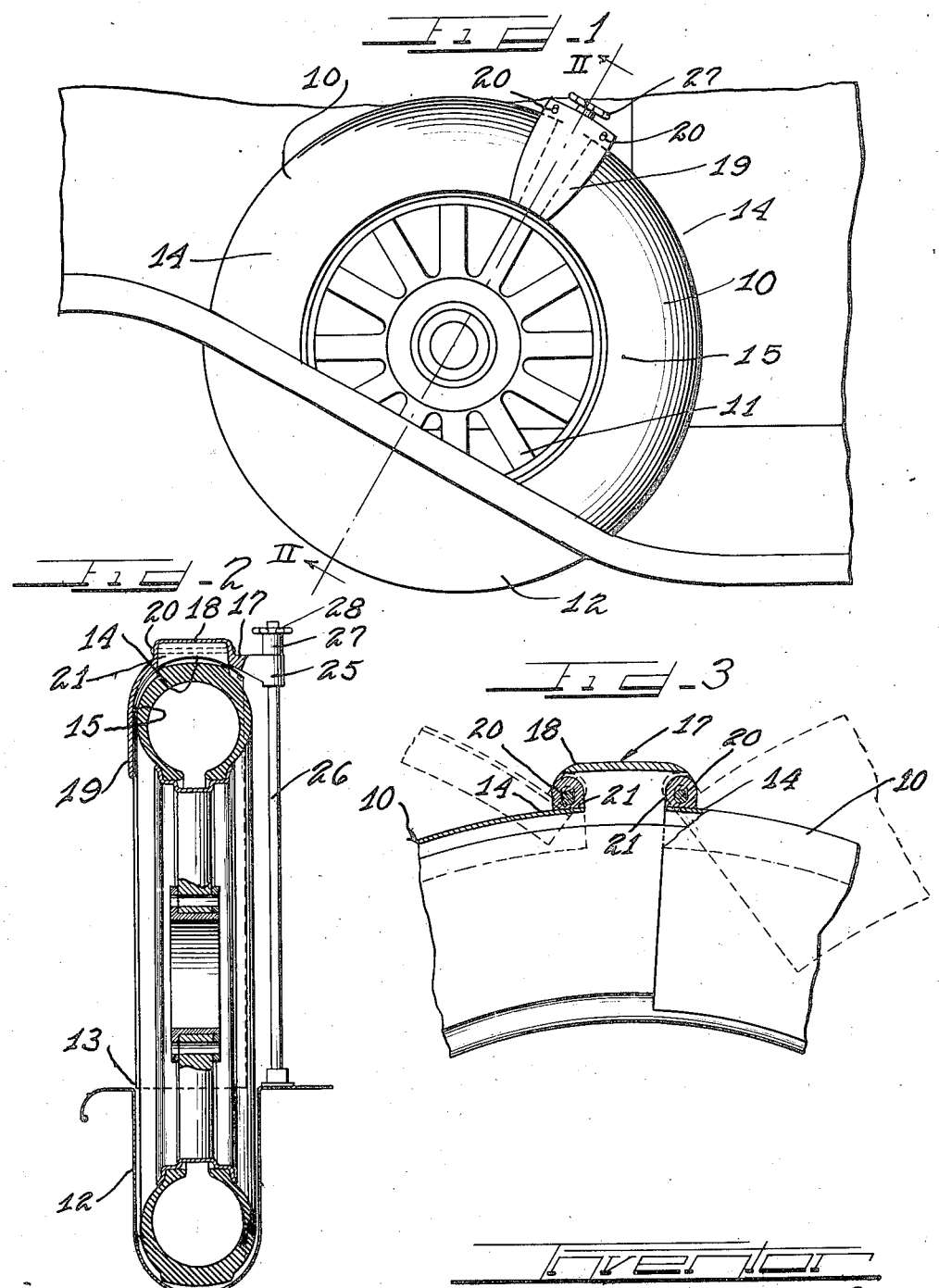
Inventor
George Albert Lyon.

Nov. 5, 1935.　　　　　G. A. LYON　　　　2,019,716
DOUBLE SECTION TIRE COVER
Filed Jan. 2, 1932　　　　2 Sheets-Sheet 2
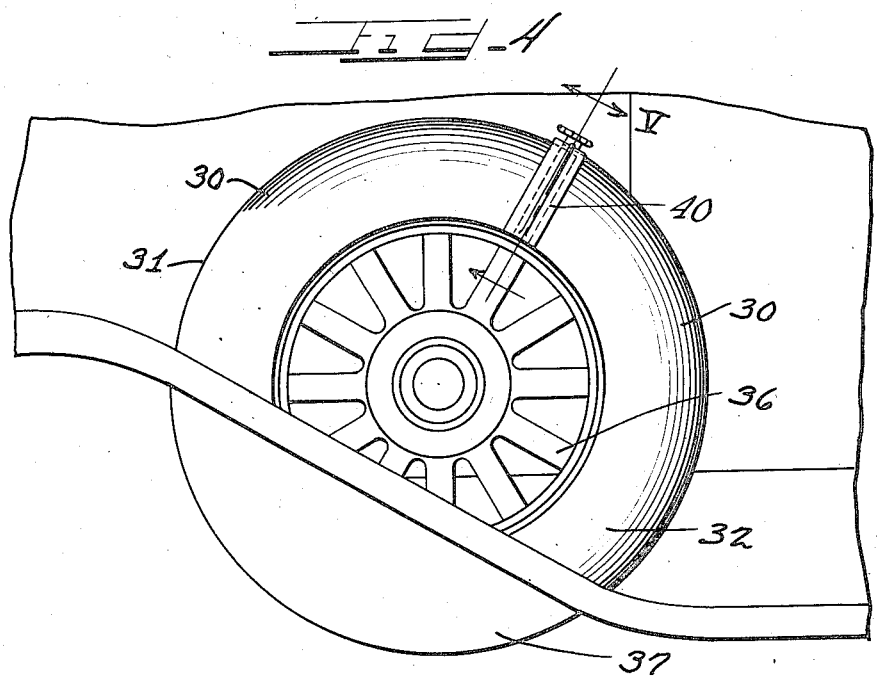
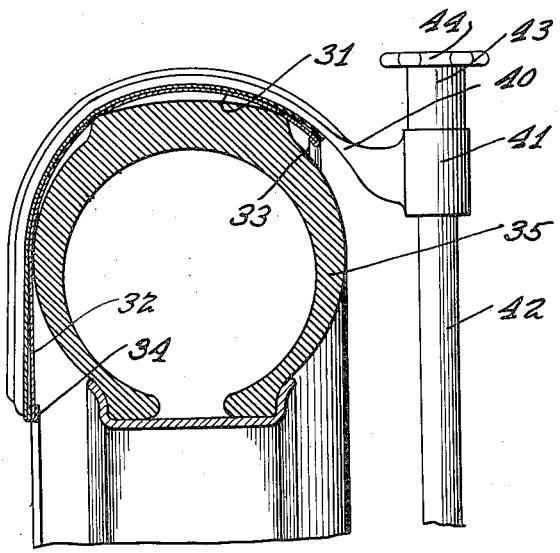
Inventor
George Albert Lyon.

Patented Nov. 5, 1935

2,019,716

UNITED STATES PATENT OFFICE 2,019,716

DOUBLE SECTION TIRE COVER

George Albert Lyon, Allenhurst, N. J., assignor to Lyon Incorporated, Asbury Park, N. J., a corporation of Delaware Application January 2, 1932, Serial No. 584,556

4 Claims. (Cl. 150—54)

My present invention relates to a tire cover for use in connection with a spare tire disposed in a fenderwell of an automobile and more particularly to a multiple section cover which sections are adapted to be spread apart as the cover is shoved downwardly on the tire disposed in the fenderwell without necessitating removal of the spare tire from the fenderwell.

An object of this invention is to provide an improved simplified form of tire cover which may be readily applied to a spare tire disposed in a fenderwell of an automobile without necessitating the removal of the spare tire.

Another object of the invention relates to the provision of a multi-section cover in which the sections are adapted to be hingedly spread apart as the cover is shoved downwardly onto the tire into proper tire protecting position on the tire.

Another object of the present invention is to provide mechanism for holding the cover on the tire so associated with the cover that such mechanism not only holds the cover in position on the tire but prevents relative pivoting of the sections with respect to each other when they are in proper tire protecting position on the tire.

In accordance with the general features of this invention there is provided a tire cover composed of two arcuate sections having their adjacent ends associated together for cooperation with a clamping mechanism arranged to prevent relative pivoting of the sections and to also hold the sections in proper tire protecting position on the tire.

Other objects and features of this invention will more fully appear from the following detailed description taken in connection with the accompanying drawings which illustrate several embodiments thereof and in which Figure 1 is a side view of a spare tire cover embodying the features of this invention and illustrating it applied to a spare tire disposed in the fenderwell of an automobile;

Figure 2 is a sectional view taken on substantially the line II—II of Figure 1 looking in the direction indicated by the arrows and illustrating the cross-sectional shape of the cover as well as the manner in which the cover sections are associated with the clamping mechanism;

Figure 3 is an enlarged fragmentary detailed view partly in section and partly in elevation illustrating in detail the manner in which each of the sections is pivotally connected to the clamping mechanism;

Figure 4 is a view similar to Figure 1 of a modified form of the invention in which the associated ends of the two sections of the cover are arranged to telescope each other and to cooperate with the clamping mechanism for holding them in place;

Figure 5 is an enlarged fragmentary sectional view taken on the line V—V of Figure 4 looking in the direction indicated by the arrows and illustrating the cross-sectional shape of the cover as well as the manner in which the clamping mechanism cooperates with the same.

On the drawings:

The cover embodying the features of my invention in Figures 1 to 3 inclusive comprises two arcuate sections 10—10 formed to fit over a spare tire wheel designated generally by the reference character 11 which wheel is disposed in a fenderwell 12 of an automobile. These two sections are identical in construction and hence the description of one will necessarily suffice for both. The free and lower ends of these two sections 10—10 are cut off so as to terminate at the mouth of the fenderwell 12 as indicated at 13 in Figure 2. Each section is of a convex construction and embodies a curved rim portion 14 and a side wall portion 15. These two portions are adapted for disposition over the tread and outer side wall respectively of the spare tire. The two sections together are of such circumferential length as to cover the exposed outer side wall and tread portions of the spare tire disposed in the fenderwell 12. The adjacent ends of the two sections 10—10 are hingedly or pivotally connected to a common clamping member designated generally by the reference character 17, the construction of which will now be described in detail.

This clamping member 17 embodies a top housing 18 having a downwardly extending plate 19 for disposition over the adjoining top edges of the side portions 15 of the two sections 10—10. In other words this plate, as well as the entire clamping member, bridges the distance separating the adjacent ends of the two sections 10—10 so that the space between dotted lines in Figure 1 is not visible from the exterior of the cover and the appearance of the cover is thus greatly enhanced. The housing member 18 carries a pair of pivot bolts 20—20 on which lugs 21—21 are disposed which lugs are secured to the adjacent edges of the rim portions 14—14 of the two sections 10—10.

The ends of the pivot pins 20—20 are disposed in elongated slots formed in the ends of the housing 18 so that when the sections are pivotally moved to the dotted line position shown in Figure 3 clearance will be afforded for the lugs 21—21 with respect to the housing 18.

The clamping arm 17 including the housing 18 has formed integral with it a hub portion 25 loosely disposed on a vertical rod 26 suitably carried by the chassis of the automobile at the rear of the spare wheel 11. This hub 25 as well as the arm 17 connected thereto is adapted to be forced downwardly on the rod 26 by means of a clamping nut 27 threadingly disposed on the upper end of the rod 26 and having a wheel like handle 28 by means of which the nut may be rotated.

Now it will be evident that when the cover sections 16—18 are in the position shown in Figure 1 the clamping arm 17 may be forced downwardly into tight cooperation with the adjacent ends of the two sections whereby these two sections are clamped in proper tire protecting position on the tire and against relative pivotal movement. The clamping arm may be held in this position by the clamping nut 27 previously described. Also, if it is so desired, suitable locking means may be provided for locking the nut 27 against rotation on the rod 26 in any manner well known to those skilled in the art.

In Figures 4 and 5 I have illustrated a modified form of the invention which differs primarily from the other form in that instead of hingedly connecting the adjacent ends of the two sections of the cover, the adjacent ends are overlapped into a telescoping fit with each other and then clamped to the spare tire in proper tire protecting position.

In this modification of the invention the two arcuate sections of the tire cover are designated generally by the reference character 30—30 and inasmuch as these sections are substantially identical it is thought that a description of one will suffice for both. These sections may be made of any suitable material other than fabric, such for example as metallic sheet, and may be fabricated by any suitable machinery, such for example as spinning or rolling apparatus. Each section embodies a rim portion 31 and a side plate portion 32 both of which portions terminate in turned edges 33 and 34 as shown in Figure 5. These two portions are integral and are formed to be disposed over the tread and outer side wall portions respectively of the tire 35. It will be noted that the tire 35 is disposed on the wheel 36 positioned in the usual automobile fenderwell 37.

Furthermore, it is to be observed that the turned edge 33 in each of the sections 30 is disposed inwardly of the outermost periphery of the tire so as to overhang the tread and thus aid in preventing lateral displacement of the cover relative to the tire.

The lower ends of the two sections 30—30 do not extend into the well 37 but rather terminate at the mouth of the well whereby the two sections may be moved relative to each other when it is desired to remove the cover from the tire without necessitating the removal of the tire from the fenderwell 37.

Due to the flexible characteristics of the material of which the sections 30—30 are composed, it is possible to overlap the adjacent ends as shown in Figure 5. In other words, the adjacent and upper ends of the two sections 30 are adapted to be placed in telescopic relation. This is accomplished by merely pressing one end into the end of the other section.

At the place where the two sections telescope each other, I provide a clamping arm 40 of a curved shape for engaging over the tops of the two telescoping sections to force the two sections downwardly into proper tire protecting position on the spare tire and to hold them in that position and against relative movement with respect to each other. The clamping arm 40 includes a hub portion 41 loosely disposed on a rod 42 suitably carried on the automobile chassis at the rear of the spare wheel. The upper end of this rod 42 has threadingly disposed on it a locking nut 43 which includes a wheel like handle 44 by means of which the nut may be rotated to move the hub portion 41 downwardly on the rod 42 and to bring the arm 40 into tight clamping engagement with the two telescoping sections 30—30.

Now it will be evident that the present cover may be readily applied to the tire by disposing the two sections on the spare tire positioned in the well and by then bringing their adjacent ends into overlapped or telescoping relation. Thereafter, the clamping arm 40 may be disposed over the telescoping ends of the two sections 30—30 and forced downwardly into tight clamping engagement with these sections so as to maintain them in proper tire protecting position on the spare tire.

I desire it understood that while I have illustrated and described in detail the preferred embodiments of this invention the invention is not to be thus limited but only in so far as defined by the scope and spirit of the appended claims.

I claim as my invention:

1. In a tire cover adapted to be shoved downwardly into proper tire protecting position on an automobile spare tire disposed in a fenderwell, a plurality of cooperable arcuate sections each including a side portion and a laterally extending rim portion for disposition over the tread of the tire and means for interconnecting the adjacent ends of said sections and constructed and arranged to clampingly hold said sections in proper tire protecting position on the tire, said sections being of such circumferential length as to have their free ends terminate substantially free of the well whereby they may be shoved onto and removed from the tire while the latter is disposed in the well.

2. In a tire cover adapted to be shoved downwardly into proper tire protecting position on an automobile spare tire disposed in a fenderwell, a plurality of cooperable arcuate sections each including a side portion and a laterally extending rim portion for disposition over the tread of the tire and means for interconnecting the adjacent ends of said sections and constructed and arranged to clampingly hold said sections in proper tire protecting position on the tire, said sections being of such circumferential length as to have their free ends terminate at the mouth of the fenderwell whereby they may be manually shoved into position on the tire without necessitating the removal of the tire from the well.

3. In an automobile spare tire cover for application to a tire in a fenderwell, a plurality of arcuate sections formed to cooperate together in covering only the exposed tread and side wall portions of the spare tire in a fenderwell so that said sections may be shoved onto and removed from the tire while the latter is in the fenderwell, and clamping means pivotally connecting the adjacent ends of said sections whereby the sections may be spread apart or moved together and constructed and arranged to also hold the sections in proper protecting position on the tire.

4. In an automobile spare tire cover for application to a tire in a fenderwell, a plurality of arcuate sections formed to cooperate together in covering the exposed tread and side wall portions of the spare tire in a fenderwell, and clamping means pivotally connecting the adjacent ends of said sections whereby the sections may be spread apart or moved together and constructed and arranged to also hold the sections in proper protecting position on the tire, said sections together extending around more than 180° of the tire and having their free ends arranged to terminate at the mouth of the fenderwell so as to be shoved onto and removed from the tire while the latter is in the fenderwell.

GEORGE ALBERT LYON.